April 2, 1946.   R. L. LUCE   2,397,675
SAND SLURRY VALVE
Filed Aug. 19, 1944   3 Sheets-Sheet 1
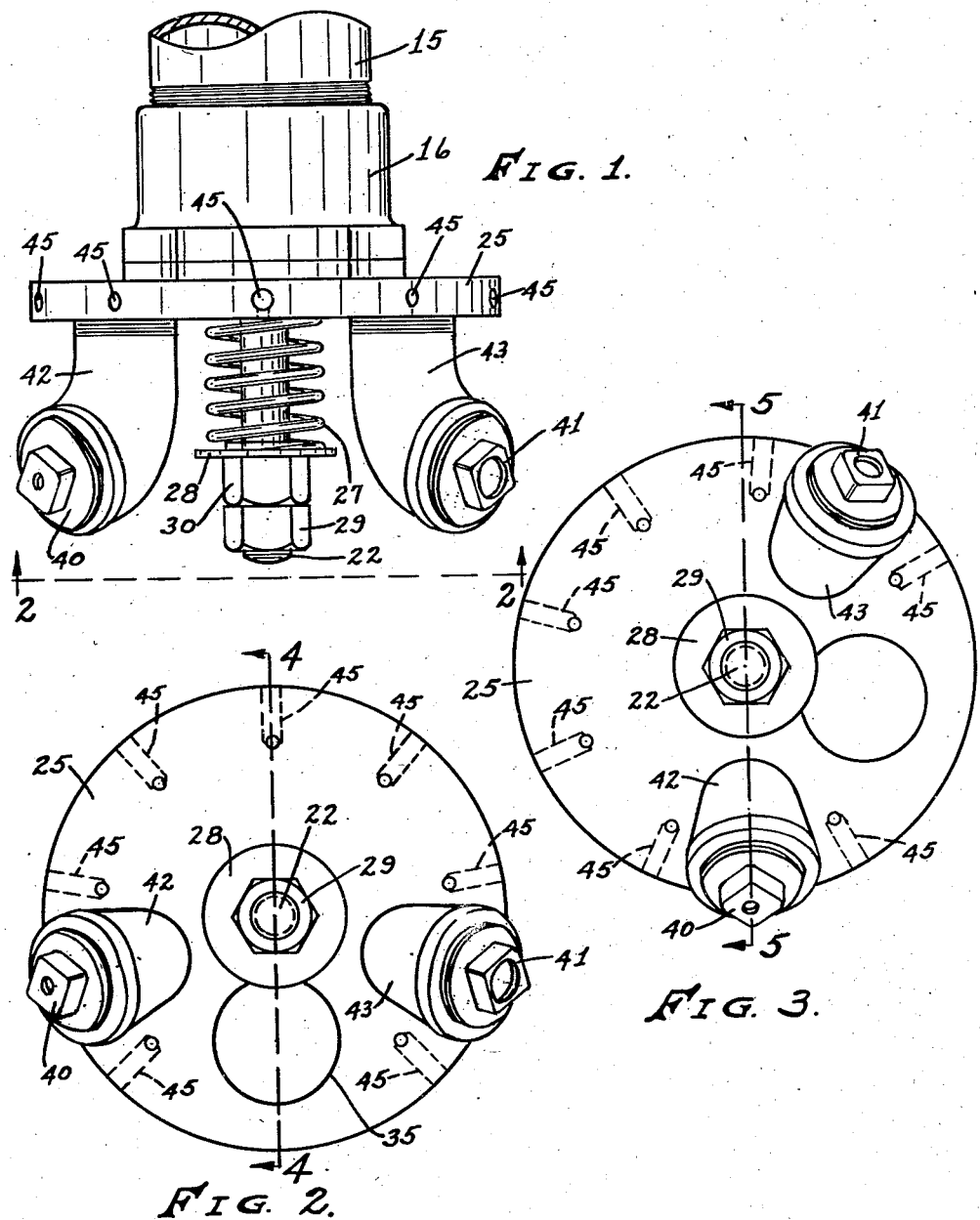
Roy L. Luce,
INVENTOR.
BY Clifford C. Bradbury
ATTORNEY.

Roy L. Luce
INVENTOR.

April 2, 1946.　　　　　R. L. LUCE　　　　　2,397,675
SAND SLURRY VALVE
Filed Aug. 19, 1944　　　　3 Sheets-Sheet 3
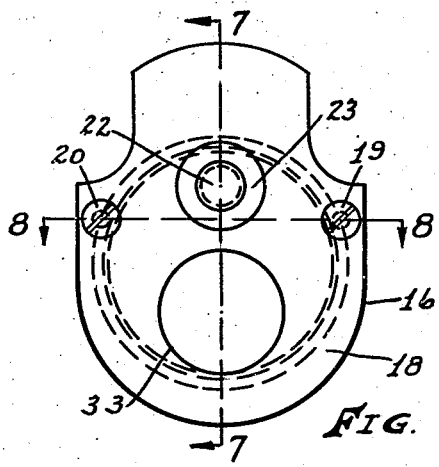
FIG. 6.
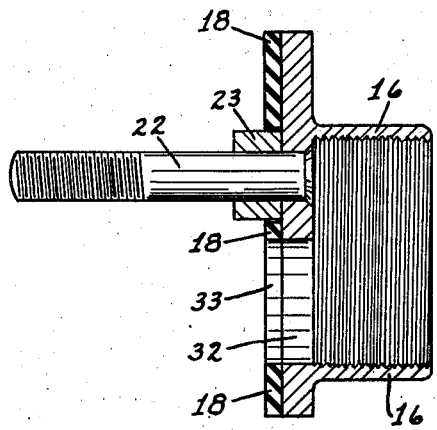
FIG. 7.
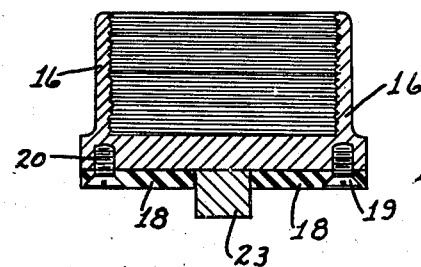
FIG. 8.
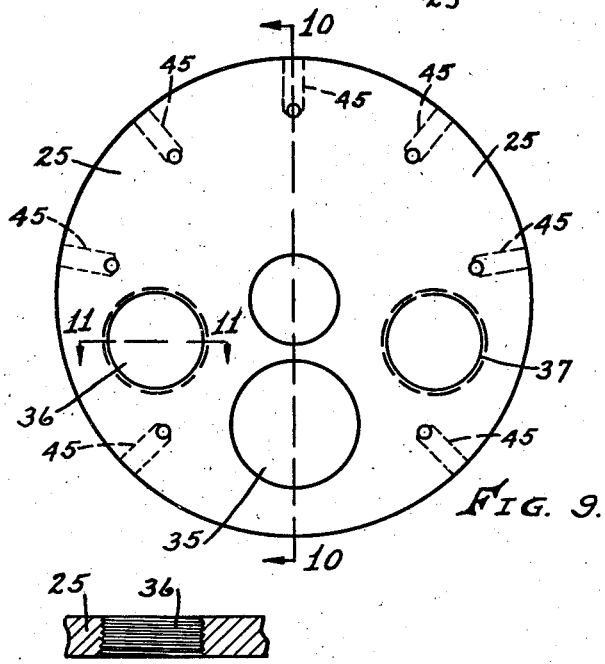
FIG. 9.
FIG. 11.
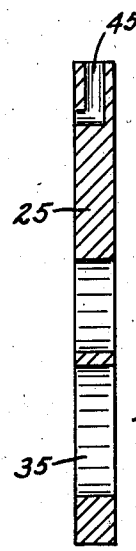
FIG. 10.
Roy L. Luce.
INVENTOR.
BY Clifford C. Bradbury
ATTORNEY.

Patented Apr. 2, 1946

2,397,675

UNITED STATES PATENT OFFICE 2,397,675

SAND SLURRY VALVE

Roy L. Luce, Chicago, Ill., assignor to Hydro-Blast Corporation, Chicago, Ill., a corporation of Illinois Application August 19, 1944, Serial No. 550,198

3 Claims. (Cl. 251—86)

My invention relates to a sand slurry valve for the control of the flow of a mixture of sand and water delivered under pressure.

The walls of the orifice through which a mixture of sand and water flows under pressure are subject to rapid erosion, the rate of erosion being somewhat proportioned to the velocity of the material passing through the orifice.

It is the object of this invention to provide a valve by means of which different orifices can be included in the flow for controlling the amount of flow, but by means of which the amount of flow can also be controlled by the degree of opening of the valve.

The further object of my invention is to provide a valve in which one of the relatively movable elements is made of rubber which works in pressure contact with a smooth metallic surface, thus eliminating the grinding effect which usually obtains when two metallic parts move relative to one another in the presence of a slurry composed of sand and water.

A further object of my invention consists in pressing the parts of the valve together yieldingly, as by a spring, so that wear on the relatively moving surfaces will be compensated for by a movement of the valve members toward one another a distance corresponding to the wear.

In accordance with my invention, a flat revolvable disc is provided with a plurality of openings, at least some of which are provided with flow limiting plugs having openings therein of differing sizes, each limiting opening being much smaller than its associated opening through the valve disc so that the velocity of flow of slurry through the openings in the vlave disc will be slight compared with the velocity of flow through the limiting openings in the removable plugs.

My invention is illustrated in the accompanying drawings in which like parts are designated by like characters throughout the several views, and in which Fig. 1 is an elevation of the assembled valve in position for flow through an unrestricted orifice.

Fig. 2 is a bottom view of Fig. 1.

Fig. 3 is a bottom view of the valve turned to position in which one of the restricted openings is in communication with the inlet conduit.

Fig. 6 is a bottom view showing the rubber wear plate.

Fig. 7 is a section taken on the line 7—7 of Fig. 6.

Fig. 8 is a section taken on the line 8—8 of Fig. 6.

Fig. 9 is a face view of the movable valve disc with flow limiting plugs removed.

Fig. 10 is a section taken on the line 10—10 of Fig. 9, and

Fig. 11 is a fragmentary section taken on the line 11—11 of Fig. 9.

Figure 4:
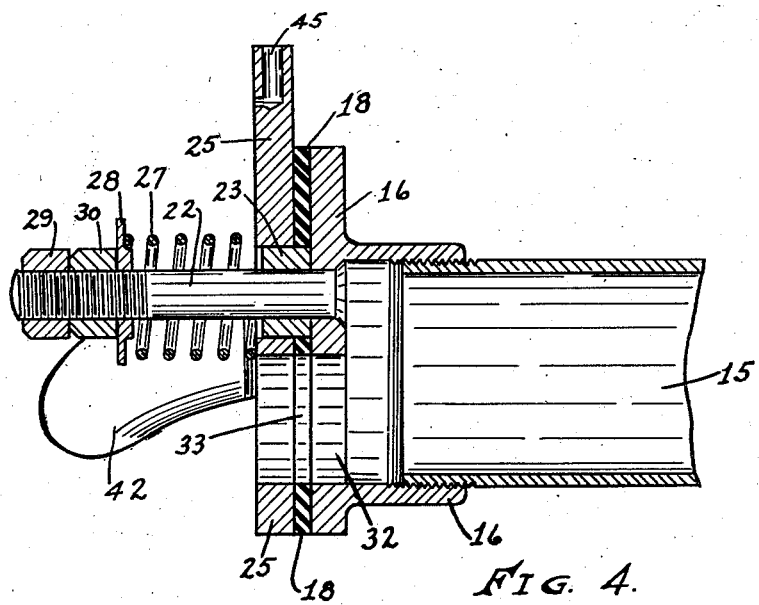
Fig. 4 is a section taken on the line 4—4 of Fig. 2.
Figure 5:
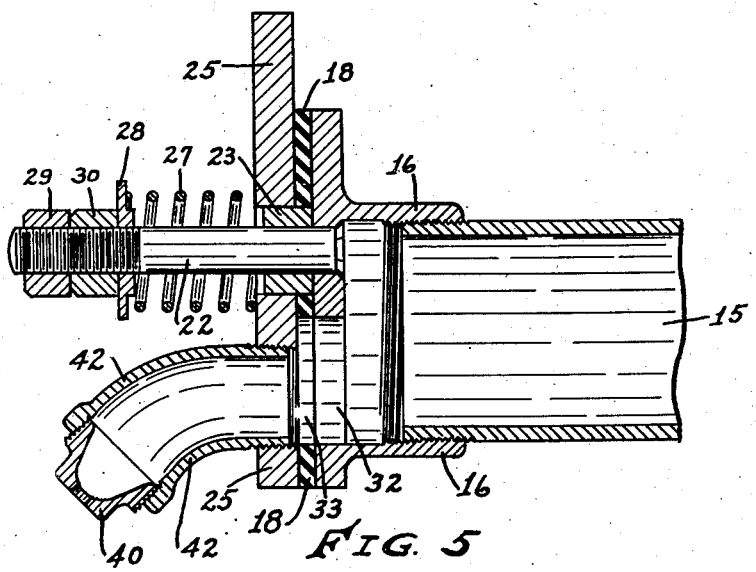
Fig. 5 is a section taken on the line 5—5 of Fig. 3.

The valve of my invention is ordinarily attached to the bottom of a vertical pipe such as 15 which is threaded into a casting 16, shown in section in Fig. 8. The lower face of the casting 16 is preferably shaped as shown in Fig. 6 and provided with a soft rubber gasket 18, having an external contour corresponding with the exterior of the lower face of the casting 16. The rubber disc 18 is preferably cemented to the face of the casting 16 and further secured by screws such as 19 and 20. The casting 16 is provided with a downwardly extending stud 22 about which a collar 23 fits closely. The collar 23 abuts the lower face of the casting 16 and is of greater length than the thickness of the rubber gasket 18, the extending portion of the collar 23 serving as a bearing or guide about which a valve plate 25, Fig. 9, may be rotated, the valve plate having a flat surface which is held in contact with the rubber gasket 18 by means of a spring 27 which is compressed by means of a washer 28 and by lock nuts 29 and 30 threaded onto the end of the stud 22. The disc of the casting 16 is provided with an opening 32 aligned with an opening 33 in the rubber gasket 18, and the valve disc 25 is provided with a plurality of openings 35, 36 and 37, each alignable with the openings through the gasket 18 and disc of casting 16. When the valve disc 25 is in position, shown in Fig. 4, a comparatively unobstructed passage way is provided from the interior of the pipe 15. This position of the valve is used for clean out purposes, but preferably not for continuous flow of slurry. When the valve disc 25 is rotated to align either the opening 36 or the opening 37 with the openings 32 and 33 through the disc of casting 16 and the rubber gasket 18, the flow is restricted by means of plugs 40 or 41, as the case may be, which plugs are mounted in the discharge end of pipe elbows 42 and 43, threaded respectively into the openings 36 and 37 in the valve disc 25. The valve disc 25 is preferably rotated by inserting a rod into one of the radially drilled holes 45, each of the holes 45 being provided with a communicating cross hole to prevent clogging of the holes 45 with sand.

Since the velocity of flow of sand slurry through the plugs 40 and 41 is very high, the openings through the plugs 40 and 41 are gradually enlarged until the flow becomes excessive, whereupon the worn plug is removed and a new plug inserted. If it is desired not to stop the flow of slurry because of a worn plug, the valve disc 25 may be rotated to a position in which the entrance to the pipe elbow from which flow is occurring is restricted by the partial displacement from alignment of the openings 33 through the rubber gasket and the openings 36 or 37, as the case may be, through the valve disc. This latter condition for flow control should be maintained for as short a time as convenient in order to avoid excessive wear at the point of restriction by reason of the high velocity of the slurry when the valve is partly closed.

Although the valve plate 25 as here illustrated is provided with only three openings, two of which are restricted, it is to be understood that a larger number of openings similar to 36 and 37 may be provided, and if the number required to secure the desired variation in flow is greater than can be located within the size of the disc illustrated, the valve disc 25 may be enlarged to any desired degree by moving the stud 22 a greater distance from the axes of the pipe 15 and registering opening in the casting 16.

While I have shown and described my invention with respect to certain details of construction, it is to be understood that I do not wish to be unduly limited thereto, certain modifications being possible without departing from the spirit or scope of my invention.

What I claim and desire to secure by Letters Patent is:

1. In a valve for sand slurry, an entrance disc having an opening therein, a flat rubber gasket attached to said disc and having a corresponding opening through it, a bearing stud extending perpendicularly from said entrance disc in a position eccentric of the opening through the disc, a valve plate pivoted upon said stud and having a plurality of openings, any one of which may be aligned with the opening through said rubber gasket by the rotation of said valve plate, at least one of the openings through said valve plate being provided with a flow limiting plug, the opening through which is of less diameter than the opening through the valve plate or rubber gasket.

2. In a valve for sand slurry, a flat entrance disc member having a slurry flow opening therein, a flat valve plate member movable with respect to the entrance disc member having a slurry flow opening therein, a rubber gasket positioned between said members fixed with respect to one of said members and movable with respect to the other of said members and having a slurry flow opening therein registerable with the openings in said members, the opening in the flat valve plate member being provided with a flow limiting plug having an opening therein of less size than the openings through either of said members or through said rubber gasket whereby the velocity of slurry flow will be restricted through the openings in said members and said rubber gasket.

3. In a valve for sand slurry, a first disc having a slurry flow opening therein, a second disc pivoted on the first disc eccentrically of the opening therein and having a plurality of openings, any one of which may be registered with the opening in the first disc by the rotation of the second disc on its pivot, a stud extending through said discs on the axis of their pivotal connection with one another, a spring surrounding said stud, pressing said discs toward one another, and a rubber gasket compressed by said spring between said discs provided with an opening for slurry flow through registering openings in said discs, and wear plugs for openings in the second disc, each having a restricted opening therein of less size than its associated opening through the second disc or the opening through the rubber gasket or the opening through the first disc.

ROY L. LUCE.